Oct. 25, 1949.     A. J. ABRAMS     2,485,542
PROTECTION OF HEAT TRANSFER MEDIA
Filed Jan. 25, 1945
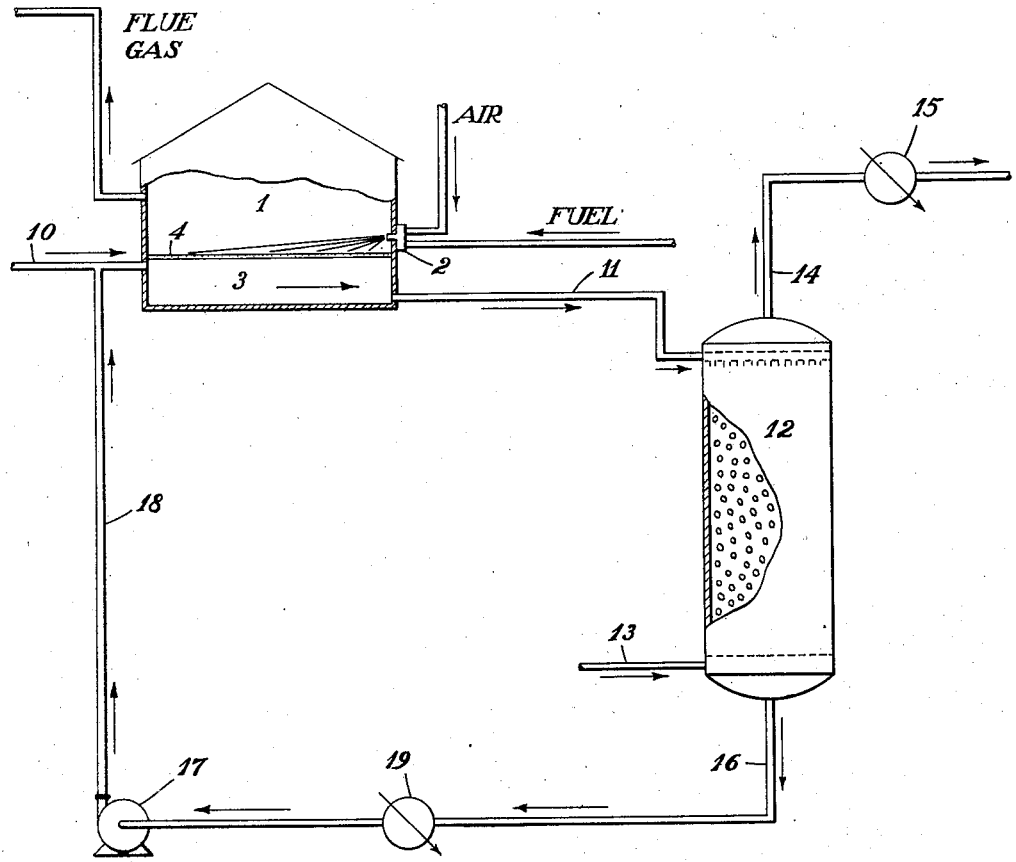
Armand J. Abrams
INVENTOR
BY John C. Stauffer
ATTORNEY Patented Oct. 25, 1949

2,485,542

UNITED STATES PATENT OFFICE 2,485,542

PROTECTION OF HEAT TRANSFER MEDIA

Armand J. Abrams, Dallas, Tex., assignor, by mesne assignments, to Socony-Vacuum Oil Company, Incorporated, New York, N. Y., a corporation of New York Application January 25, 1945, Serial No. 574,611

5 Claims. (Cl. 23—1)

This invention relates to the protection of oxygen-sensitive liquid heat transfer agents, such as, molten metals and alloys, against oxidation and vaporization while such heat transfer agents are being heated in an oxidizing atmosphere prior to circulation to a reaction zone. More particularly this invention relates to an improved process and apparatus for use in heating such oxygen-sensitive heat transfer agents which require protection when being heated directly by combustion gases and open flames or otherwise in an oxidizing atmosphere.

The hot oxidizable heat transfer agents find utility in, for example, numerous processes which have been proposed for the conversion of organic compounds in the vapor phase by pyrogenic reactions in the presence of contact masses, which may or may not exert a catalytic effect upon the desired reactions. Typical of such processes are cracking of petroleum gas oil, either thermally or catalytically, to form lower boiling naphthas, the reforming of petroleum naphthas, the cyclization of straight chain hydrocarbons to aromatics, the dehydrogenation of petroleum naphthas and the production of a synthesis gas comprising hydrogen and carbon monoxide from normally gaseous hydrocarbons for use as feed gas in the Fischer-Tropsch type synthesis of normally liquid hydrocarbons.

Most of the prior art methods for hydrocarbon conversion involve the transfer of heat through a confining wall to the reactants. Such indirect heat exchange methods are subject to a practical limitation on their upper temperature and, therefore, in order to convert methane and other normally gaseous hydrocarbons at high temperatures, as, for example, in the production of synthesis gas, very expensive equipment of limited life would be required. Other methods have been proposed for furnishing heat to endothermic reactions which methods involve directly contacting hydrocarbons with a heat transfer agent, for example, methods in which the hydrocarbons are brought into direct contact with vapors of the heat transfer agent. A serious drawback to this latter method of direct heat transfer is the absence of an economical method for recovering the vapors of the heat transfer agent.

The present invention relates to processes which use a liquid body of the heat transfer agent for direct heating, particularly when applied to high temperature conversion of hydrocarbons. An example of this type of operation is in processes where the hydrocarbons are bubbled through the liquid body of heat transfer agent. Improved methods of contacting the liquid heat exchange medium with reactants in packed towers, of heating the heat transfer medium and of removing carbon from the same are taught in my U. S. Patents 2,354,353 and 2,354,354 which methods utilize a second liquid medium, which is insensitive to oxygen, to heat the oxygen-sensitive medium and also to remove suspended carbon therefrom. I have also taught and claimed the use of oxygen-insensitive heat transfer media for pyrogenic reactions of organic compounds in packed reactors under nonflooding conditions in my copending application, Serial No. 505,797, filed October 11, 1943, now U. S. Patent No. 2,399,532. The present invention particularly contemplates the use of the hot heat transfer agent in processes of the type illustrated by these applications, although the hot heat transfer agent is obviously capable of use in other processes.

My invention concerns the heating of an oxygen-sensitive liquid heat transfer medium in a heating zone containing an oxidizing atmosphere, the oxygen heat transfer medium being blanketed with a relatively thin protective cover of oxygen-insensitive liquid such as liquid glass. This method of protecting an oxygen-sensitive heat transfer medium is especially applicable to processes which utilize liquid metals of relatively low vapor pressure as direct heat transfer media in endothermic reactions requiring temperatures in excess of 1500° F. such as the temperatures required in the production of synthesis gas described in the copending application of Armand J. Abrams, Manuel H. Gorin and Charles Ovid Baker, Serial No. 574,612, filed January 25, 1945, now U. S. Patent No. 2,449,359 and in the copending application of Armand J. Abrams and Manuel H. Gorin, Serial No. 574,613, filed January 25, 1945.

An object of the invention is to provide a means of heating an oxygen-sensitive heat transfer agent in a combustion zone, said agent being protected from immediate direct contact with the flame and combustion gases of the combustion zone. A further object of the invention is to reduce the tendency of a mass of liquid heat transfer agent to vaporize under the conditions prevalent in a high temperature combustion type heating zone. Still another object of the invention is to provide a means for removing carbon from an oxygen-sensitive heat transfer agent thus conditioning said agent for recycle and transfer of heat to an endothermic hydrocarbon conversion following the reheating step.

When carrying out endothermic reactions involving organic compounds, for example hydrocarbons, in the presence of contact masses in refractory packed towers to which heat is supplied directly by means of liquid heat transfer agents, carbon may or may not accumulate in the transfer agent depending on the properties of the contact material, on the type of hydrocarbon reactants and on the temperature of operation of the process. For example, nonporous and glazed refractory materials favor the removal of the carbon by the heat transfer agent. Operating temperatures in the range of from 850° F. to 1200° F. employed in cracking gas oils and reforming naphthas over relatively nonporous packing in the presence of a flowing liquid heat transfer agent usually result in accumulation of carbon in said agent. On the other hand, if lime or other porous refractory is used as the packing in a reactor wherein methane, ethane or propane is undergoing conversion at temperatures above about 1800° F. in the presence of a liquid heat transfer agent such as lead, and wherein the agent is contacted with the packing under nonflooding conditions, the carbon largely accumulates in the lime packing provided the cycle of operation is not carried beyond the point where the lime will absorb the carbon. I have found that lime will absorb up to 3 mols of carbon per mol of lime packing when "cracking" methane under such conditions. In any event, I have found that if the liquid heat transfer agent contaminated with carbon is introduced to the combustion heating zone slightly below the interface between the relatively dense liquid heat transfer agent and a less dense blanket of protective covering, the major part of the carbon in the recycled heat transfer agent separates therefrom and collects in and on the blanket covering whence it is removed by burning in direct contact with the flame in the combustion chamber proper.

The "blanket" of oxygen-insensitive covering for the heat transfer agent should be plastic and substantially liquid or semi-liquid at temperatures below the operating temperature of the combustion zone, and it should be of less density than the oxygen-sensitive liquefied heat transfer agent in order that it may be floated on the surface thereof. Preferably, it should be a material which does not have a definite melting point but rather, a material which becomes plastic and remains as a rather plastic and viscous liquid or semi-liquid over a relatively broad temperature range in order that it will offer resistance to rupture by the blast of flame and combustion gases. Closely related to this property is that of resisting flow along with the liquid heat transfer agent, that is, the "blanket" should be capable of remaining substantially stationary while superimposed on a slowly moving body of the agent. Hence the protective coverings best suited for high temperature operation, that is, above 1800° F., consist of different types of glass described hereinbelow. The material should be substantially nonvolatile under the operating conditions of the furnace in order to avoid loss of the protective covering in the flue gas effluent of the furnace. The choice of protective covering will also depend upon the chemical inertness of the same with respect to the liquid heat transfer agent under the conditions of operation of the heating zone and on the properties of the reaction product where chemical reaction occurs. Thus, for example, certain glass compositions tend to react with molten lead or tin at extreme temperatures to form glass of different chemical composition which product glasses are themselves suitable protective coverings. Hence in some cases, chemical reaction between the covering and the molten heat transfer agent does not prevent the use of such chemically active combinations.

Still another desirable characteristic of the protective covering is that of ready heat transfer therethrough by conduction and also by radiation. The heat conductivity through molten glass is in general relatively low although, heat transfer by radiation through such materials is high. However, I prefer to use only a thin "blanket" of the protective covering, that is, a cover within the range of from about ⅛ to about 2.0 inches in thickness in order to offer minimum resistance to heat transfer therethrough. The thermal conductivity of glass becomes quite high at the extremely high temperatures prevalent in the combustion zone.

The term glass as used in the specification and claims includes silicates, borates and metaphosphates which are relatively high melting and of low volatility under the conditions of operation of a conventional high temperature combustion furnace. Blast furnace slag which may contain a high percentage of alkaline earth oxides is an example of a glass which is plastic at temperatures above about 2000° F., the temperature of incipient plasticity depending on the relative amount of basic oxide components to acidic oxide components in the slag. A sodium glass containing about 40 per cent sodium oxide, 2 per cent calcium oxide and 58 per cent silica is liquid at about 1650° F. and sodium metasilicate with a melting point of about 2000° F. are suitable for use at moderate temperatures. However, I prefer to avoid the use of high alkali metal glasses particularly in those processes wherein the heat transfer agent is circulated over porous catalytically active packing since it requires only a small amount of contamination of most catalysts with alkali oxides to materially reduce their activity. Silicate glass containing less than 20 weight per cent of alkali oxide is preferred and the amount of silicon dioxide will usually be less than 70 weight per cent and greater than 20 weight per cent. Other components of the silicate glasses suitable for the protection of oxygen-sensitive metallic heat transfer media are the oxides of boron, aluminum and lead. Additional oxides which may be incorporated in the glasslike protective covering are the oxides of potassium, lithium, beryllium, magnesium, zinc, strontium, barium, titanium, zirconium and tin. Oxides of arsenic, antimony, manganese and iron may be present in very small amounts, usually no more than traces by way of impurities. In general, combination of refractory oxides of elements of groups I, II, III, IV and V of the periodic table and particularly combinations of refractory oxides of elements in series 2, 3, and 4 of groups I, II, III and IV are suitable. The borosilicate glasses are particularly adaptable due to their relatively high heat conductivity and low melting properties as are also the lead silicates to which have been added from 3 per cent to 10 per cent of boric oxide.

My invention is thus not confined to the use of silicate glasses as a protective covering. For example, a mixture consisting of about 20 weight per cent of $B_2O_3$ and 80 weight per cent of sodium tetraborate which mixture melts at about 1100° F. functions well as a protective covering, particularly at temperatures within the range of 1200° F. to about 1800° F. Heat transfer properties of such a mixture are highly satisfactory. I may also use a phosphate type glass such as calcium metaphosphate having a melting point of 1787° F. for higher temperature operation, that is, at temperatures from about 1900° F. to 2500° F. or lead metaphosphate which melts at about 1472° F. may be used at temperatures within the range of 1500° F. and 2200° F. Thus the selection of a protective covering is made on the basis of physical state of the material at operating temperatures and on the basis of volatility of the material under furnace operating conditions.

Referring now to the drawing which is a diagrammatic sketch of an apparatus and method for practicing my invention, heating zone 1 consists of a refractory lined combustion furnace equipped with burners 2. The inner walls of furnace 1 are constructed to obtain maximum heat transfer to the flowing heat transfer agent 3 by radiation as well as by direct impingement of the flame and combustion products thereon. In practicing my invention, I superimpose on the body of heat transfer agent 3 a relatively thin layer of an oxygen-insensitive glass comprising a mixture of associated oxides which when subjected to temperatures above about 900° F. preferably exhibit the physical properties of glass, that is, a chemical combination usually becoming plastic before the liquid state is reached as contrasted with definite compounds having clearly defined melting points. Although true glasses are preferred, I may also use definite chemical compounds, such as, calcium metaphosphate, lead metaphosphate or lead metasilicate.

A liquid heat transfer agent, such as melted lead, melted tin or melted metallic alloys of suitable melting point and volatility, is introduced to furnace 1 via line 10 slightly below the interface between the molten body of agent 3 and the protective blanket 4. As the heat transfer agent passes through furnace 1, it is heated to the desired temperature in approximate counterflow with flame propagation and combustion gases, and is withdrawn therefrom at a point near the bottom of the mass in order to cause a minimum of disruption of the blanket surface. The hot metal passes by gravity flow through line 11 to refractory packed tower 12. In tower 12 the hot metal flows downward in amounts less than sufficient to cause flooding of the voids of refractory packing which packing may be nonporous, porous and inert or catalytic. As the metal descends, it is met by a rising stream of organic reactant vapor such as a mixture of hydrocarbons or a mixture of hydrocarbons with carbon dioxide and/or steam. The organic vapor is introduced through line 13 and the reaction product passes overhead through line 14 and cooler 15. Cooler 15 may include a recovery system for metal heat transfer vapors where the temperatures maintained in tower 12 are such that appreciable amounts of the heat transfer agent are volatilized in the presence of the gaseous reactant.

The partially cooled metal heat transfer agent passes from tower 12 through line 16, whence it is returned by means of pump 17 and line 18 to feed line 10. In conversions wherein the temperature maintained in tower 12 is in excess of about 1500° F., as for example, in the production of a synthesis gas from a normally gaseous hydrocarbon or mixture of normally gaseous hydrocarbons with carbon dioxide and/or steam, it may be necessary to lower the temperature of the heat transfer agent in order to condition the same for pumping to furnace 1. Hence cooling system 19 is provided. Cooling system 19 may consist of a waste heat boiler or it may consist of a refractory packed heat exchanger wherein gaseous feed to reaction tower 12 or fuel gas or air passing to furnace 1 are preheated in alternate cycles with the flow of hot heat transfer agent therethrough.

As indicated hereinabove, the contamination of molten heat transfer agent in line 16 with respect to suspended carbon will be dependent on the character of the feed stock introduced to tower 12, on the character of the packing in this tower and on the temperature of operation. Minor contamination of the molten liquid can be tolerated in cooling system 19 and pumping system 17 and may be removed by introducing the recycled agent at a point slightly below the protective covering interface with the mass of metallic heat transfer agent in furnace 1. When operating at lower temperatures in the conversion of normally liquid hydrocarbons the heat transfer effluent from the packing in tower 12 will contain a considerable amount of suspended carbon in which case it may be passed in contact with a molten salt for the removal of the suspended carbon prior to recycle as described in U. S. Patent 2,354,353.

While I have described my invention as particularly applicable to the heating of oxygen-sensitive molten metal heat transfer agents in an atmosphere containing oxygen for use in contacting organic reactants in packed towers, I do not wish to be limited to such application of the use of a protective cover for the agent. Obviously, the method may be used in heating such liquid heat transfer agents as lead, zinc, tin and alloys for use in other processes involving different methods of contacting organic reactants as, for example, by mixing the heat transfer agent with the reactant vapors or by contacting the reactant in a liquid pool of the heat transfer agent in any desired manner.

My invention has the advantage of providing a method for the direct heating of an oxygen-sensitive heat transfer liquid in a heating zone containing oxygen such as a directly fired combustion zone. The invention is also broadly applicable to any method of supplying heat to oxygen-sensitive heat transfer agents where such treating is carried out in an oxidizing atmosphere.

The expression "oxygen-sensitive" as used in describing the liquid heat transfer agent in the specification and claims means the susceptibility of the heat transfer agent to chemically react with oxygen in an oxygen containing atmosphere at relatively high temperatures such as heating zone temperatures. The expression "oxygen-insensitive" as used in describing the protective "blanket" material means the substantial absence of the tendency to react with oxygen in an oxygen containing atmosphere at elevated temperatures such as those temperatures described in the specification and claims.

Having thus described my invention, I claim:

1. In the method of transferring heat to a zone to be maintained at an elevated temperature in which a molten oxidizable metallic heat transfer agent is caused to pass continuously in heat transfer relationship with said zone and the heat removed from said zone restored in a separate heating zone the improvement which comprises continuously introducing the molten metal withdrawn from the first zone into the bottom portion of the heating zone and maintaining a pool of the molten metal in the bottom of the heating zone, superimposing on the surface of said pool of metal in heating zone as a protective covering a substantially stationary layer consisting of a fused mixture of oxides selected from the class consisting of refractory oxides of elements of series 2, 3 and 4 of groups I to IV of the periodic table of the elements, introducing hot oxidizing gases into the upper portion of the heating zone, continuously withdrawing hot molten metal from the pool of molten metal in the heating zone beneath the protective covering at a point remote from the point of introduction of said molten metal and regulating the flow of molten metal to and from the pool of metal in said heating zone to maintain the interface between the surface of the metal of said pool and protective covering thereof slightly above the point of introduction of the molten metal to the heating zone whereby impurities in said molten metal are transferred to the protective layer.

2. The process of claim 1 in which silicon is one of the elements whose oxide is present in the protective covering.

3. The process of claim 1 in which lead is the metallic heat transfer agent.

4. In the method of heating a continuous stream of an oxygen-sensitive molten metal heat transfer agent containing combustible impurities in an oxidizing atmosphere in a heating zone the improvement which comprises maintaining in said heating zone a pool of said molten metal, superimposing on the surface of said pool of molten metal as a protective covering a substantially stationary layer consisting of a fused mixture of oxides selected from the class consisting of refractory oxides of elements of series 2, 3, and 4 of groups I to IV of the periodic table of the elements, continuously introducing hot oxidizing gases into the upper portion of the heating zone, continuously withdrawing hot molten metal from a point near the bottom of said pool and continuously introducing molten metal to said pool at a point remote from the point of withdrawal of said hot molten metal and slightly below the interface between the surface of the molten metal in said pool and the protective covering thereon whereby combustible impurities in said molten metal introduced to said pool are caused to pass through the protective covering and become oxidized by said oxidizing gases.

5. The process of claim 4 in which silicon is one of the elements whose oxide is present in the protective covering.

ARMAND J. ABRAMS.

REFERENCES CITED

The following references are of record in the file of this patent:

UNITED STATES PATENTS

| Number | Name | Date |
|---|---|---|
| 159,831 | Mackay | Feb. 16, 1875 |
| 943,639 | Rockey et al. | Dec. 14, 1909 |
| 1,004,676 | Neilly | Oct. 3, 1911 |
| 1,141,529 | Danckwardt | June 1, 1915 |
| 1,309,165 | White | July 8, 1919 |
| 1,454,351 | Thomas | May 8, 1923 |
| 1,672,459 | Jansen | June 5, 1928 |
| 1,710,846 | Smith | Apr. 30, 1929 |
| 1,921,868 | Evans | Aug. 8, 1933 |
| 2,033,975 | Davis | Mar. 17, 1936 |
| 2,055,313 | Ruthruff | Sept. 22, 1936 |
| 2,058,947 | Betterton | Oct. 27, 1936 |
| 2,329,817 | Betterton et al. | Sept. 21, 1943 |
| 2,357,694 | Schutte | Sept. 5, 1944 |

OTHER REFERENCES

Metals and Their Alloys, Vickers (Henry C. Baird & Co., N. Y.; 1923) pp. 208–209.